United States Patent [19]

Pool

[11] 4,379,019

[45] Apr. 5, 1983

[54] MASKING MACHINE

[76] Inventor: Daniel L. Pool, 4414 E. Lincoln Dr., Paradise Valley, Ariz. 85253

[21] Appl. No.: 185,188

[22] Filed: Sep. 8, 1980

[51] Int. Cl.[3] ............................................ B32B 31/00

[52] U.S. Cl. .................................... 156/527; 156/554; 156/577; 156/579; 225/38

[58] Field of Search ............... 156/523, 527, 554, 536, 156/574, 577, 579; 225/34, 37, 38

[56] References Cited

U.S. PATENT DOCUMENTS

| | | | |
|---|---|---|---|
| 2,374,103 | 4/1945 | Johnson | 156/554 |
| 3,553,060 | 1/1971 | Waltz | 156/554 |
| 4,052,248 | 10/1977 | Hunter | 156/554 |

*Primary Examiner*—Michael G. Wityshyn

*Attorney, Agent, or Firm*—Don J. Flickinger

[57] ABSTRACT

A roll of tape or paper is releaseably retained upon a roll holder by a flexible retention member, carried by the holder and normally outwardly biased to engage the core of the roll. A pivotally connected arm is biased to urge a bearing element at the free end thereof against the outer surface of the paper roll to check uncoiling of the paper sheet. The bearing element is automatically lifted and positioned in response to movement of the roll against a camming surface during attachment of the roll to the roll holder. A detachably securable auxiliary roll holder applies tape along the normally free edge of the paper sheet. Also disclosed is an auxiliary tape dispenser carried by the frame of a portable masking machine.

7 Claims, 10 Drawing Figures

FIG. 1
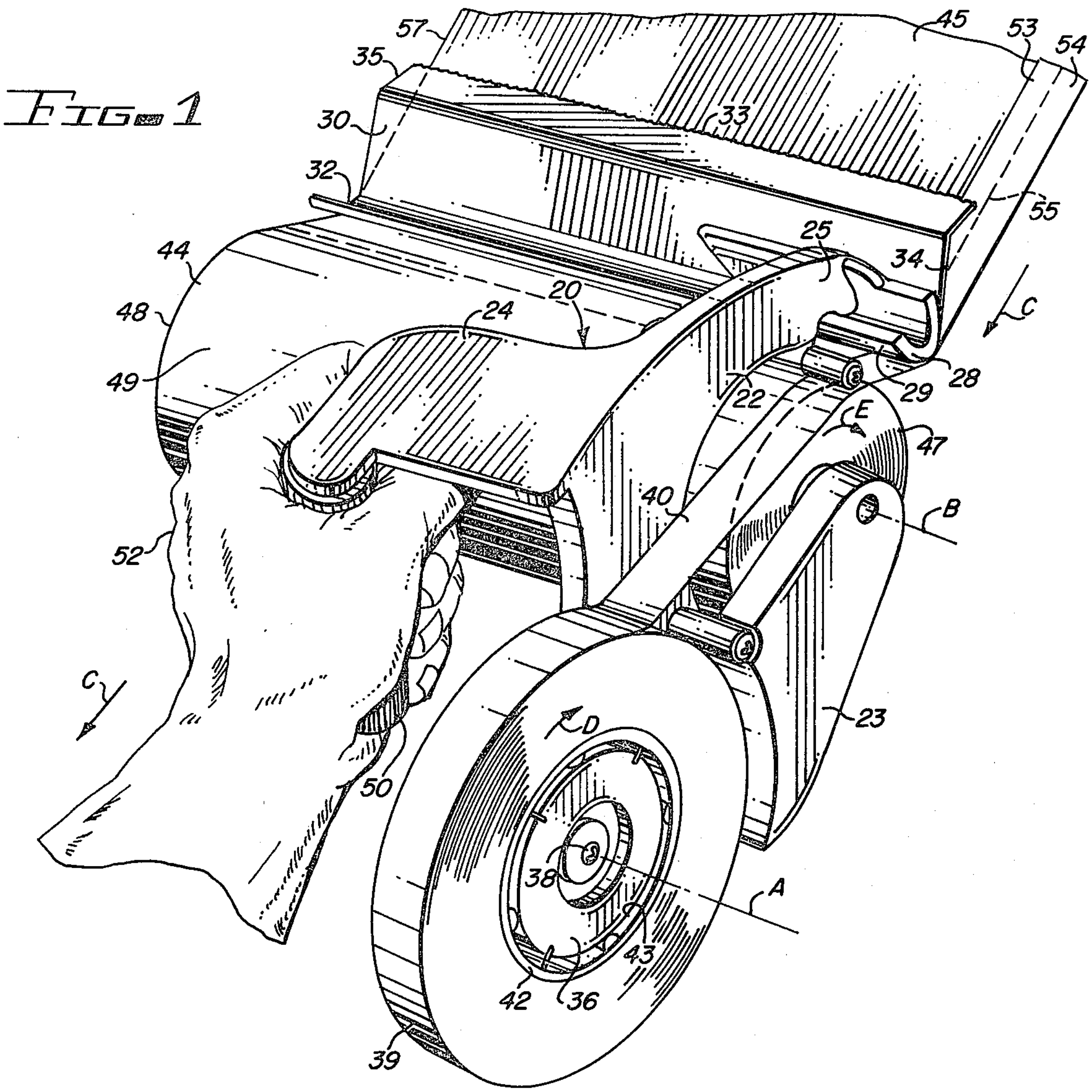
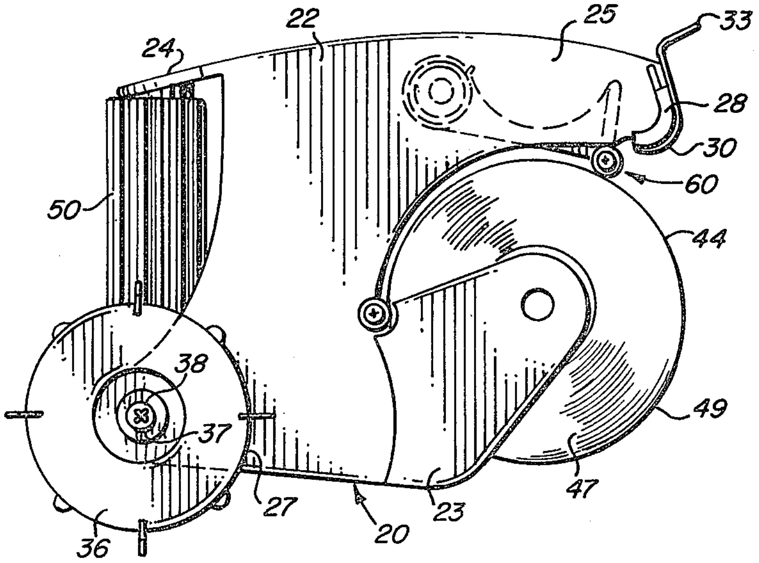
FIG. 2

MASKING MACHINE

BACKGROUND OF THE INVENTION

1. Field of the Invention

This invention relates to masking machines.

More particularly, the instant invention relates to masking machines such as the type used for applying tape and paper to a surface preparatory to applying a finish to the surface.

In a further aspect, the present invention concerns improvements to enhance the utility of masking machines.

2. Description of the Prior Art

The prior art is replete with various devices for applying tape and paper to a surface in preparation for painting, trimming and other finishing techniques. In general, such devices, which have achieved broad acceptance by both industrial and non-commercial users alike, are employed for protecting a designated portion of a surface from a finish or treatment applied to an adjacent portion of the surface. Exemplary is the general painting and decorative trimming of vehicle bodies, walls of buildings and other large and small items in connection with vocational and avocational pursuits.

Generally referred to as masking machines, the devices are available in a variety of sizes and configurations especially adapted for various uses. While having similar function, specifically the dispensing of tape and paper, and having commonly analogous components including a holder for a roll of tape, a holder for a roll or paper and a cutting edge for severing the tape and the paper, the various masking machines present exceedingly dissimilar appearances. The apron machine, for example, is usually a large, bulky, floor-supported apparatus. The hand held machine, on the other hand, is a relatively lightweight compact unit.

Exemplary of masking machines, and herein chosen for purposes of orientation in connection with the instant invention, is the hand held device set forth in U.S. Pat. No. 3,950,214. The referenced device includes a handled frame having a rotatably affixed paper roll holder and a rotatably affixed tape roll holder for supporting a roll of coiled paper sheet and a roll of coiled, pressure sensitive tape, respectively. The holders, which have parallel axes of rotation, are oriented such that the tape is dispensed along and overlapping an edge of the paper sheet. As the machine is moved along, the paper and the tape are drawn therefrom and the free portion of the tape is adhesively secured to the surface by the wiping action of the curved portion of a guide bar. When the end of the area to be masked has been reached, the tape and paper are severed by an elongate cutting edge extending from the frame parallel to the axis of rotation of the holders.

The masking machine, as described above, has proven to satisfactorily achieve the objects for which it was devised. This is attested, in part, by commercial success. Observation, however, has indicated areas of interest and concern not before considered in connection with the instant machine or analogous devices.

Tape and paper, for example, are available in various widths. Users, therefore, frequently exchange the rolls of tape and paper in accordance with the requirements of the immediate task. As a result, the cardboard tube forming the core of the roll becomes enlarged, impairing proper fit of the roll upon the holder. An analogous problem of improper fit, either too loose or too tight, occurs in new rolls as a result of the inherent variance in the size of cores.

Observations of operators utilizing the machine has revealed other phenomena. For example, users frequently carry an additional roll of tape for periodic or continuous taping along the free edge of the paper sheet. Also, it is noted that the paper tension spring which insures even movement of the roll of paper and prevents inadvertent unrolling requires independent manual manipulation as the paper roll is installed upon the paper roll holder.

In view of the foregoing and other observations, experimentation has been conducted for the purpose of improving the referenced masking machine and other similar devices.

Accordingly, it is an object of the instant invention to provide improvements for masking machines.

Another object of the invention is the provision of improvements which will enhance the function of the machine and facilitate the convenience of the operator.

Still another object of the invention is to provide improved means for detachably securing the roll of tape and the roll of paper to the respective roll holders.

And another object of this invention is the provision of an improved roll holder which will properly accept rolls of varying size.

Yet another object of the invention is to provide means which will reduce manual manipulation while affixing a roll of paper.

And still another object of the invention is the provision of presenting a conveniently available roll of tape for selective use by the operator.

Yet still another object of the invention is to provide selectively usable means for optional continuous taping along the free edge of the paper sheet.

And a further object of the present invention is the provision of improved paper tensioning means.

Still a further object of the invention is to provide means which facilitate the rapid and convenient exchange of rolls upon the roll holders.

Yet still a further object of the invention is the provision of improvements, as above, which are usable upon hand held and other masking machines.

SUMMARY OF THE INVENTION

Briefly, to achieve the desired objects of the instant invention in accordance with a preferred embodiment thereof, first provided are retention means usable in connection with the respective roll holders for holding the roll of tape and the roll of paper sheet. The retention means includes an element extendably and retractably movable relative the holder and normally extendably biased so as to engage the bore of the respective roll. More specifically, the retention means includes a flexible contact element having an outwardly projecting contact portion which engages the bore of the roll.

Next provided are means for checking the uncoiling of the paper sheet including an arm having a fixed end pivotally connected to the frame of the machine and a bearing element carried at the free end. Biasing means, preferably a torsion spring carried at the fixed end of the arm, urges the bearing element toward the holder for bearing against the outer surface of the roll of paper. More specifically, the bearing element is in the form of a pivotally connected roller. Also carried at the free end of the arm are guide means for lifting the arm and positioning the bearing element over the outer surface of the roll in response to the movement of the roll during assembly with the roll holder. The guide means may include a camming surface.

Further improvements for the masking machine include tape dispensing means carried by the frame of the machine for supporting an auxiliary roll of tape at a position remote from the primary roll of tape. In a further aspect, the tape dispensing means includes an auxiliary tape roll holder and an auxiliary cutting edge for severing the tape. The auxiliary cutting edge is carried by an arm extending from the frame of the machine.

Yet another improvement includes an auxiliary tape applying unit detachably securable to the machine for supporting a second roll of tape which is dispensed along the free edge of the paper sheet. More specifically, the tape applying unit includes an auxiliary tape roll holder and means for detachably securing the auxiliary tape roll holder to the machine. In accordance with one embodiment of the invention, the attachment means includes a subframe having the auxiliary tape roll holder pivotally secured thereto and a support member extending therefrom and detachably securable to the frame of the machine.

BRIEF DESCRIPTION OF THE DRAWINGS

The foregoing, and further and more specific objects of the instant invention will become readily apparent to those silled in the art from the following detailed description of a preferred embodiment thereof taken in conjunction with the drawings, in which:

FIG. 1 is a perspective view of a prior art hand held masking machine incorporating improvements constructed in accordance with the teachings of the instant invention;

FIG. 2 is a side elevation view of the right-hand end of the device of FIG. 1, the roll of tape being removed for purposes of illustration;

DESCRIPTION OF THE PREFERRED EMBODIMENTS

Figure 3:
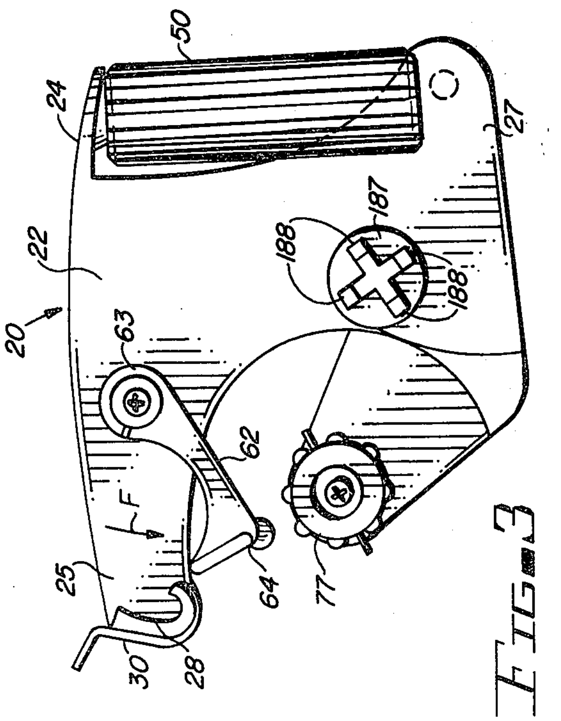
FIG. 3 is a side elevation view taken from the left-hand end of the illustration of FIG. 1, the roll of tape and the roll of paper being removed for purposes of illustration.

Turning now to the drawings in which like reference characters indicate corresponding elements throughout the several views, attention is first directed to FIG. 1 which shows a hand held masking machine including a frame 20 having substantially flat section 22, offset section 23 and offset bracket 24. Offset section 23 and bracket 24 extend in opposite directions from flat section 22. For purposes of orientation, it is considered that frame 20 includes a forward portion 25 and a rearward portion 27, as further seen in FIG. 2. At the forward portion 25, frame 20 is provided with a transverse elongate mounting bracket 28 having outer arcuate surface 29. Frame 20, including each of the foregoing named elements, is integrally formed of plastic in accordance with conventional injection molding techniques.

An elongate guide bar 30, stamped from relatively thin sheet metal, is detachably carried by mounting bracket 28. Guide bar 30 includes an arcuate portion 32 and serrated cutting edge 33. Orientated perpendicularly to flat section 22, guide bar 30 further includes a fixed end 34 detachably secured to mounting bracket 28 and a free end 35. Arcuate surface 29 of bracket 28 is matingly received within arcuate portion 32.

Tape roll holder 36 is rotatably mounted upon a spindle, not immediately illustrated, integral with rearward portion 27 of frame 20. Holder 36 is retained upon the spindle by means of a washer 37 and a screw 38 which is threaded into the spindle. Holder 36 rotates about axis A, which is generally parallel to guide bar 30, especially cutting edge 33. A roll 39 of coiled, pressure-sensitive tape 40 having core 42 with bore 43 is detachably carried by tape roll holder 36.

A roll 44 of coiled paper sheet 45 having first end 47, second end 48 and outer surface 49 is held by a paper roll holder rotatably carried by offset section 23. The paper roll holder, which will be described in further detail as the description ensues, is rotatable about axis B which is parallel to axis A.

Elongate handle 50, having an axis generally parallel to flat section 22 and generally perpendicular to axes A and B, extends from offset bracket 24. During operation, a human hand, such as designated by the reference character 52, holds handle 50 and moves the masking machine in the direction of arrowed line C. Accordingly, as sheet 45 is dispensed and remains stationary, tape roll 39 and paper roll 44 rotate in the direction of arrowed lines D and E, respectively. Paper roll 44 is offset relative tape roll 39 such that tape 40 overlaps end 47. Therefore, tape 40 includes a first continuous component 53 which is secured to the edge of paper sheet 45 and a second component 54 which is available for continuous adhesion to the surface to be masked. Arcuate portion 32 of guide bar 30 functions as a shoe wiping along tape 40 to ensure adhesion to the surface. For purposes of orientation, sheet 45 is considered to have a fixed edge 55 and a free edge 57.

The foregoing description of the prior art hand held masking machine is set forth for purposes of environment and orientation concerning the improvements which are the subject of the instant application. It is understood that the above described masking machine is intended to be typical of such devices and not limiting upon the improvements hereinafter set forth. For a further description of such machines, attention is invited to U.S. Pat. No. 4,096,021, issued June 20, 1978 and entitled HAND HELD MASKING MACHINE. Further detailed description of the machine will be made as necessary in connection with the improvements of the instant invention as will now be described in detail.

Improved Paper Tensioning Means

Figure 4:
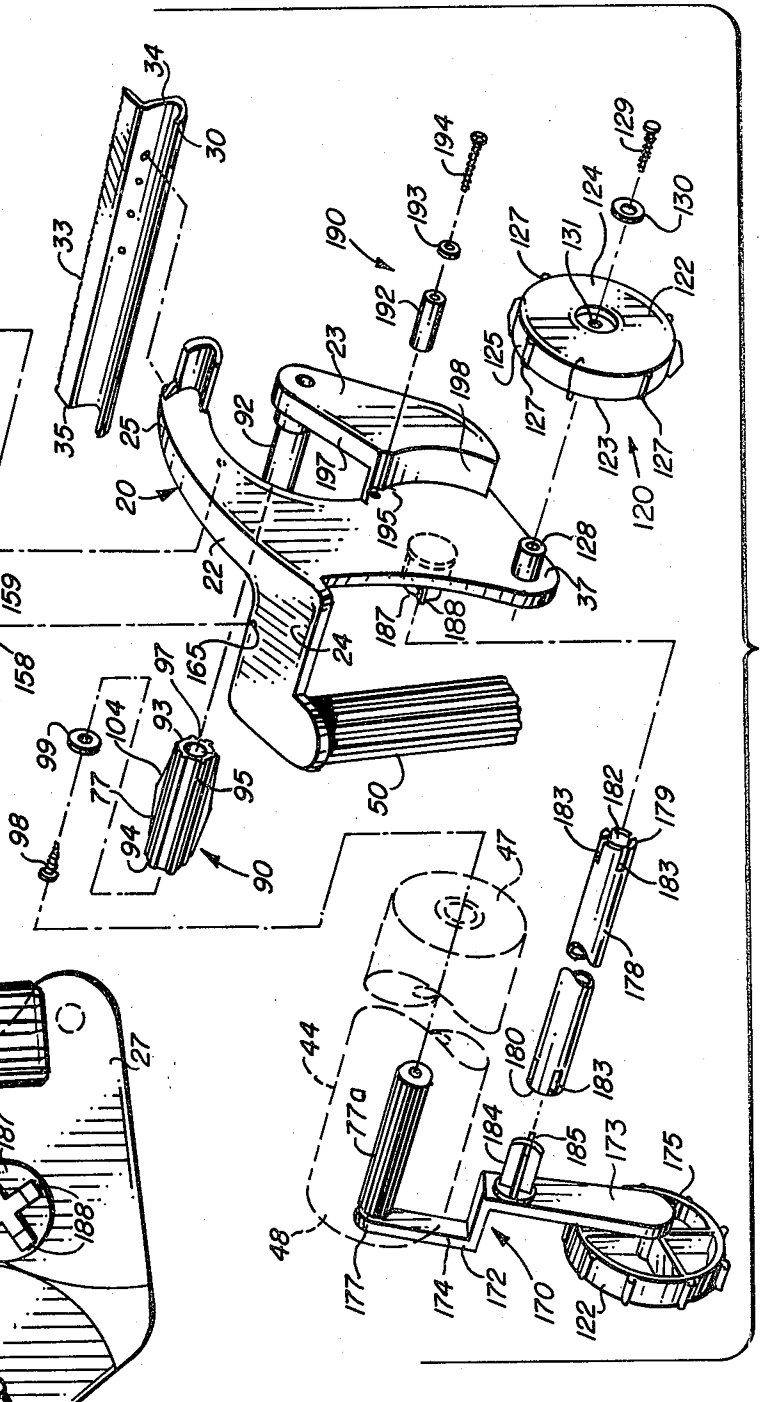
FIG. 4 is an exploded perspective view of the masking machine of FIG. 1 and illustrating further improvements thereof.

Attention is now directed to FIG. 4 which generally shows the improvements of the instant invention including the improved paper tensioning means, generally designated by the reference character 60, for applying tension to the outer surface of the paper roll and checking uncoiling of the paper sheet. As the description ensues, it will become apparent to those skilled in the art that the paper tensioning means 60 has further utility in connection with other apparatus for dispensing sheet material from a coiled roll thereof.

Figure 5:
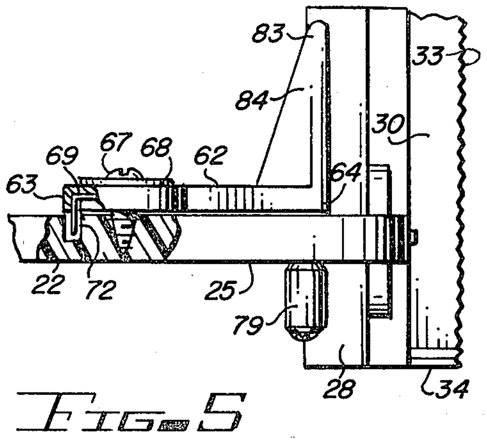
FIG. 5 is a fragmentary top plan view of the forward portion of the device of FIG. 1 especially illustrating a particular improvement thereof.
Figure 6:
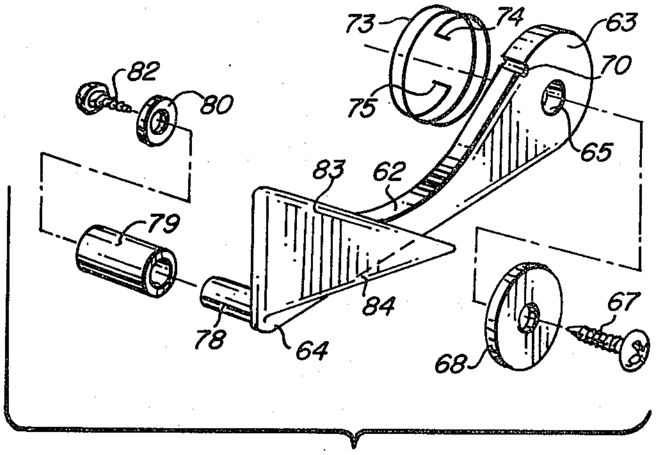
FIG. 6 is an exploded perspective view of the improvement shown in FIG. 5.

Referring more specifically to FIGS. 5 and 6, it is seen that the improved paper tensioning means 60 includes an arm 62 having fixed end 63 and free end 64. Aperture 65 extends through fixed end 63. Screw 67, passing through washer 68 and aperture 65, pivotally connects fixed end 63 to frame 20 in accordance with conventional practice. The pivotal axis of arm 62 about screw 67 is generally parallel to previously described axes A and B of the exemplary hand held masking machine.

Recess 69, concentric with aperture 65 and notch 70, are formed in the fixed end 63 of arm 62. In addition to an aperture for receiving screw 67, connection of the instant improvement requires further modification in the form of opening 72 formed in frame 20. Conventional torsion spring 73 having ends 74 and 75, resides within recess 69. End 74 resides within notch 70. End 75 resides within opening 72. Accordingly, torsion spring 73 functions as biasing means for urging free end 64 of arm 62 in a direction toward paper roll holder 77 as indicated by arrowed line F in FIG. 3.

A projection 78 extends from the free end 64 of arm 62 in a direction toward the fixed end 34 of guide bar 30. Roller 79 is secured to projection 78 by washer 80 and screw 82 in accordance with conventional practice. The axis of rotation of roller 79 is substantially parallel to the axis of rotation B of paper roll holder 77. An ear 83 projects from free end 64 of arm 62 in a direction toward free end 35 of guide bar 30. Ear 83 terminates on the underside with a camming surface 84, which for purposes of orientation, is considered to diverge upwardly in a direction toward the free end 35 of guide bar 30.

During operation, roller 79 functions as a bearing element, and in response to spring 73, maintains tension upon the outer surface 49 of roll 44 ensuring the even movement of roll 44 during the dispensing of paper sheet 45. The tension of roller 79 against roll 44 further ensures that it does not become inadvertently unrolled during storage or transportation between uses. Camming surface 84 functions as guide means for lifting arm 62 and positioning roller 79 over the outer surface 49 of roll 44 in response to movement of roll 44 during assembly with roll holder 77. During assembly, roll 44 is moved along axis B in a direction toward frame 20. During this movement, first end 47 of paper roll 44 contacts surface 84 causing arm 62 to move in a direction away from roller 77, counter to the direction of arrowed line D and compressing spring 73. Accordingly, the outer surface 49 of roll 44 will pass under the free end 64 of arm 62 and roller 79. Ear 83 also functions as a handle for manual rotation of arm 62, if desired.

FIGS. 1 and 2 illustrate paper tensioning means 60 during operation.

Improved Paper Roll Holding Means

Referring again to FIG. 4, there is seen improved paper roll holding means, generally designated by the reference character 90, which is a modification of conventional prior art roll holding means. In accordance with the masking machine described in connection with FIGS. 1 and 2, which typifies the prior art, a spindle 92 extends from offset section 23 of frame 20 in a direction toward the free end 35 of guide bar 30. Paper roll holder 77, having inner end 93, outer end 94 and fluted outer surface 95, further includes blind bore 97 which is rotatably journaled upon spindle 92. Screw 98, passing through washer 99 and outer end 94, threadedly engages the free end of spindle 92 for attachment of holder 77 to frame 20. Conventional prior art practice teaches that fluted outer surface 95 is slightly larger than the hollow cylindrical bore of the cardboard core of the paper roll whereby the flutes partially embed within the core for retention of the paper roll.

Figure 10:
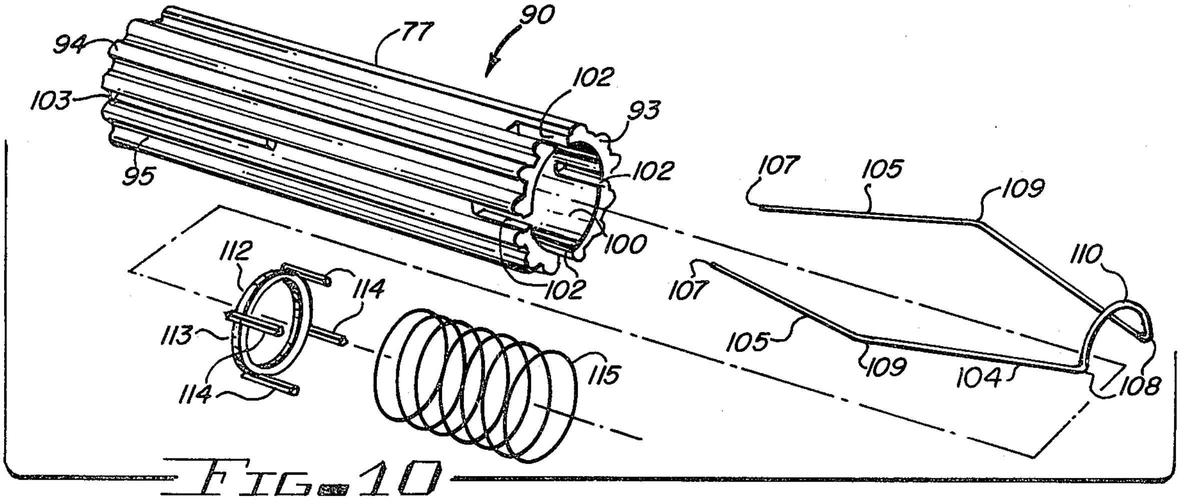
FIG. 10 is an enlarged exploded perspective view of the improved paper roll holder seen in FIG. 3.

Roll holder 77 is modified, by the teachings of the instant invention, as seen in FIG. 10, by a counterbore 100 and four equally spaced slots 102 extending inwardly from inner end 93. A further modification includes a pair of diametrically opposed recesses 103, only one specifically herein illustrated, in outer surface 95 extending inwardly from outer end 94 in alignment with two of the slots 102.

Retention member 104, fabricated of a flexible material such as music wire, includes elongate contact elements 105, each having a forward end 107 and a rearward end 108. Intermediate ends 107 and 108, each contact element 105 is bent to form outwardly projecting contact portion 109. Rearward ends 108 terminate with inwardly directed portions integrally joined as arcuate member 110.

Retention member 104 is assembled with holder 77 such that rearward ends 108 of contact elements 105 extend through respective slot 102 and forward ends 107 reside within respective recesses 103. Arcuate member 110 resides within counterbore 100 partially encircling spindle 92. Spring guide 112 includes ring element 113 slidably received within counterbore 100 and abutting arcuate member 110 and ends 108 of retention member 104. Four equally spaced fingers 114 project from ring element 113 in a direction toward frame section 23. Fingers 114 are slidably received within respective slots 102 and encase compression spring 115 such that spring 115 bears against ring element 113 to ensure pressure against retention member 104. The other end of spring 115 bears against frame 20. Spring 115 functions as biasing means normally urging retention element 104 in a direction toward the outer end 94 of roll holder 77.

The normal distance across contact portions 109 is greater than the diameter of the bore of a paper roll. The paper roll is assembled with holder 77 in a direction from outer end 94 toward inner end 93. In response to movement of the paper roll, contact elements 105 flex such that contact element 109 moves toward outer surface 95 and ends 107 and 108 extend. That is, ends 107 move toward end 94 within recesses 103 and ends 108 move within slots 102 toward end 93. It is noted that the distance across ends 107, residing within recesses 103, is less than the diameter of the bore of the core of the paper roll. The employment of retention member 104 suggests that the outer surface 95 of holder 77 may be reduced in size to not larger than the diameter of the core of the paper roll.

Improved Tape Roll Holding Means

The improved tape roll holding means of the instant invention, generally designated by the reference character 120 in FIG. 4, in general similarity to the improved paper roll holding means 90, is a modification of conventional tape roll holding means. The conventional tape roll holding means, as exemplified by the previously described hand held masking machine, includes a tape roll holder 122 having inner end 123, outer end 124 and cylindrical outer surface 125. Spaced apart outwardly projecting longitudinally extending ribs 127 normally engage the bore of the core of the tape roll as previously described. Bore 131, having a counterbore not shown but extending inwardly from inner end 123, extends axially through holder 122. The counterbore is rotatably received upon spindle 128 projecting from frame 20 in a direction opposite spindle 92. Screw 129 passing through bore 131 and carrying washer 130 is threaded into spindle 128 for attachment of holder 122 to frame 20 in accordance with conventional practice.

Figure 7:
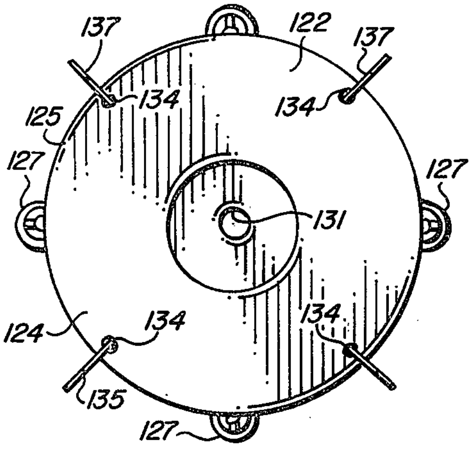
FIG. 7 is an enlarged front elevation view of the improved tape roll holder shown in FIG. 2.
Figure 8:
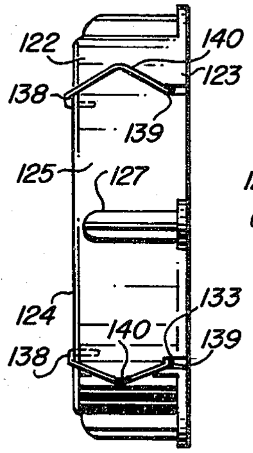
FIG. 8 is a side elevation view of the improved tape roll holder of FIG. 7.
Figure 9:
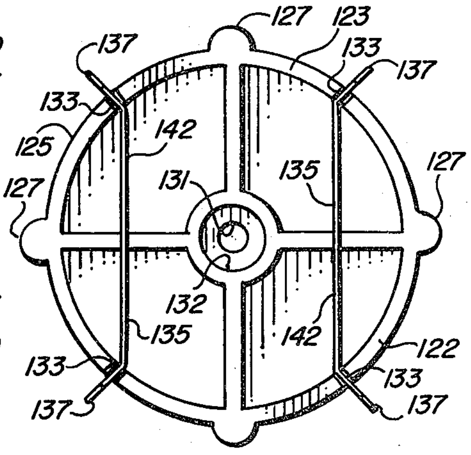
FIG. 9 is a rear elevation view of the improved tape roll holder illustrated in FIG. 7.

The counterbore 132, concentric with bore 131 and sized to rotatably receive spindle 128, is illustrated in FIG. 9, which, along with FIGS. 7 and 8, illustrate the modifications of the instant invention.

Tape roll holder 122 is modified by the formation of four radial slots 133 extending inwardly from inner end 123 and four openings 134 extending longitudinally inward from outer end 124. Each opening 134, which is preferably near outer surface 125, is aligned with a respective slot 133. Two identical retention members 135 are carried by roll holder 122. Each retention member 135 cooperates with two slots 133 and two openings 134.

Each retention member 135, in general similarity to previously described retention member 104, is generally U-shaped including contact elements 137 having forward ends 138 and rearward ends 139. Intermediate ends 137 and 139, each contact element 137 is bent to form outwardly projecting contact portion 140. Rearward ends 139 are directed inwardly extending through slots 133 and integrally joined by member 142. Each forward end 138 is generally hook-shaped having a terminal portion thereof slidably extending into a respective opening 134.

Being commonly fabricated of a flexible material, such as music wire, the function and operation of retention element 135 is generally analogous to that of retention element 104. Contact elements 137, by virtue of the material of construction, are normally biased outwardly from the outer surface 125 of holder 122 so as to engage the bore of the roll. During assembly of the roll with the holder, contact portions 140 deflect inwardly imparting longitudinal movement to ends 138 and 139 within the openings 134 and slots 133, respectively.

Auxiliary Tape Dispensing Means

The auxiliary tape dispensing means of the instant invention, generally designated by the reference character 150 in FIG. 4, includes a tape roll holder 122 having retention members 135 as previously described in connection with FIGS. 7–8 and combination bracket 152. Combination bracket 152 includes arm 153 having fixed end 154 and free end 155. Boss 157 carried at fixed end 154 is shaped to be received against frame 20. Specifically, boss 157 terminates with a surface 158 which bears upon handle bracket 24 and a depending flange 159 which extends over the edge thereof. Spindle 160, sized to be rotatably received within bore 131, projects from fixed end 154 in a direction opposite the direction of boss 157.

Screw 162 extending through washer 163, bore 131 and bore 164 coaxial with spindle 160 and boss 157, threadedly engages opening 165 in handle bracket 24 to secure the assembly 150 to frame 20. While holder 122 is free to rotate, combination bracket 152 is stabilized against rotation by the abutment of flange 159 against the edge of handle bracket 24. Bar 167, extending upwardly from free end 155, supports serrated cutting edge 168. Bar 167 is spaced sufficiently from holder 122 to accommodate a roll of tape therebetween. It is also noted that cutting edge 168 is generally parallel to the axis of rotation of holder 122. The positioning of auxiliary tape dispensing means 150 on handle bracket 24 in close proximity to handle 50, reduces the leverage and imparts maximum stability between the hands of the user as tape is drawn from the roll upon auxiliary tape roll holder 122 and severed upon auxiliary cutting edge 168.

Auxiliary Tape Applying Means

Auxiliary tape applying means, generally designated by the reference character 170 in FIG. 4, is another improvement contemplated by the present invention. The immediate improvement is detachably securable to a masking machine for the purpose of applying tape along the free edge 57 of paper sheet 45 in an arrangement similar to the application of tape along the fixed edge 55 of paper sheet 45.

The auxiliary tape applying means includes subframe 172 having first offset section 173 and second offset section 174 terminating with respective first and second free ends 175 and 177. An auxiliary tape roll holder, another tape roll holder 122 which may or may not be modified by retention members 135, is secured to first offset section 173 proximate end 175 in accordance with means herein previously described. An auxiliary paper roll holder 77*a* similar to holder 77 which may or may not include retention member 104, is secured to second offset section 174 proximate free end 177 by means previously described.

Attachment means for detachably securing subframe 172 to frame 20 includes elongate support member 178 having inner end 179 and outer end 180. A socket 182 is formed in inner end 179. Several equally spaced grooves 183 are carried by support member 178, extending inwardly from inner end 179 and communicating with socket 182. Correspondingly, another socket 182 and grooves 183 are formed in outer end 180. A projection 184 having tabs 185 extends from subframe 172 in a direction toward frame 20. A similar projection 187 having tabs 188 extends from frame 20 in a direction toward subframe 172.

Auxiliary tape applying means 170 is optionally attached to a masking machine when it is desired to adhesively affix both edges of the paper sheet to the surface to be masked. Paper, such as roll 44, is available in various widths. Accordingly, several support members 178 are available corresponding in length to the available widths of paper. The initial step of assembly includes selection of the proper length of support member 178 and attachment thereof to subframe 172. During assembly projection 184 is entered into socket 182 with tab 185 entering respective grooves 183. The assembly is then moved in a direction toward frame 20 with auxiliary roll holder 77*a* being guided into the bore of roll 44 and the other socket 182 and associated grooves 183 being engaged with projection 187 and tabs 188, respectively.

The engagement of the respective tabs and grooves prohibits rotation of subframe 172 relative to frame 20. It is noted that the axis of rotation of the auxiliary paper roll holder is coincident with previously described axis B. Due to the offset of subframe 172, a roll of tape held by auxiliary tape roll holder 122 is dispensed to overlap free edge 57 of paper sheet 45 as previously described in connection with the dispensing of tape 40. For this purpose, the axis of rotation of the auxiliary tape roll holder carried by subframe 172 is parallel to the axis of rotation of the auxiliary paper roll holder carried by subframe 172. It is also within the scope of the instant invention, that for purposes of convenience in hand held masking machines, subframe 172 is oriented such that the auxiliary paper roll holder rotates about an axis of rotation coincident with the axis of rotation of the primary tape roll holder carried by frame 20.

Improved Tape Guiding Means

With reference to FIG. 1, it is seen that the tape roll 39 is mounted upon freely rotating holder 36. Tape 40 extends as a ribbon between roll 39 and paper roll 44. Inadvertent advancement of roll 39 in the direction of arrowed line D, without corresponding movement of paper roll 44, uncoils and dispenses surplus tape 40 which then adheres to offset section 23. Correction must be made, normally by rerolling of the surplus tape upon the roll, prior to further use of the machine.

The instant invention remedies the foregoing malady by virtue of improved tape guiding means illustrated in FIG. 4 and generally designated by the reference character 190. Improved tape guiding means 190 includes roller 192 secured to frame 20 in accordance with conventional techniques by washer 193 and screw 194. A semicircular recess 195 for receiving roller 192 is formed at the location previously occupied by the apex of sides 197 and 198 of offset section 23.

Inadvertently unrolled surplus tape will sag between the roll of tape and the roll of paper becoming adhered to roller 192. The roller 192, being rotatably about an axis parallel to axes A and B, functions as a guide to feed the surplus tape onto the roll of paper. This is in contrast to the previous arrangement in which the tape became adhesively secured to an immovable object.

Various modifications and changes to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. A hand held masking machine for dispensing paper and tape to a surface comprising:

- a frame having an outer, an inner and an upper side, and front, central and rear portions;
- an offset to the frame displaced in the direction of the outer side of the frame;
- a primary tape roll holder mounted on the outer side of the rear portion of the frame for rotation about a first axis, said primary tape roll holder adapted to have a roll of masking tape mounted thereon;
- a paper roll holder having a given length mounted on the inner side of the offset portion of the frame for rotation about a second axis, said paper roll holder adapted to have a roll of paper having a hollow cylindrical bore mounted thereon for rotation about the second axis;
- a handle bracket having an upper and a lower side mounted on the upper central portion of the frame and extending in a direction substantially parallel to the second axis and away from the inner side of the frame;
- a handle secured to the lower surface of the handle bracket and depending from the handle bracket so that the hand of the user of the masking machine is spaced from the inner side of the frame;
- a guide bar mounted on the front portion of the frame;
- an auxiliary tape roll holder adapted to have a roll of masking tape mounted thereon;
- means for mounting the auxiliary tape roll holder on the upper side of the handle bracket for rotation about a third axis substantially perpendicular to the upper surface of the handle bracket; and
- means for severing strips of masking tape from a roll of masking tape mounted on the auxiliary tape roll holder mounted on said means for mounting the auxiliary tape roll holder on the handle bracket.

2. A hand held masking machine as defined in claim 1 in which the means for severing strips of masking tape from a roll of masking tape mounted on the auxiliary tape roll holder includes an arm having a fixed end secured to said means for mounting the auxiliary tape roll holder on the handle bracket and a free end supporting an auxiliary cutting edge.

3. A hand held masking machine as defined in claim 2 in which the auxiliary cutting edge is substantially parallel to the third axis of the auxiliary tape roll holder.

4. A hand held masking machine for dispensing paper and tape to a surface comprising:

- a frame having outer, inner and upper sides; and a front, central and rear portions;
- an offset to the frame displaced in the direction of the outer side of the frame;
- a primary tape roll holder mounted on the outer side of the rear portion of the frame for rotation about a first axis, said primary tape roll holder adapted to have a roll of masking tape mounted thereon;
- a paper roll holder having a given length mounted on the inner side of the offset portion for rotation about a second axis, said first and second axes being substantially parallel, said paper roll holder adapted to have a roll of paper having two sides, a hollow cylindrical bore, and a given width, mounted thereon for rotation about the second axis; the width of the roll of paper being greater than the length of the paper roll holder;
- a handle bracket mounted on the upper central portion of the frame and extending inwardly from the frame in a direction substantially parallel to the second axis;
- a handle secured to the handle bracket and depending therefrom so that the hand of the user is spaced from the inner side of the frame;
- a guide bar mounted on the front portion of the frame;
- a subframe;
- an auxiliary tape roll holder mounted on the subframe for rotation about a third axis, said auxiliary tape roll holder adapted to have a roll of masking tape mounted thereon;
- an auxiliary paper roll holder mounted on the subframe for rotation about a fourth axis, said third and fourth axes being substantially parallel; and means for mounting the subframe on the inner side of the frame so that the auxiliary paper roll holder is positioned within the bore of the roll of the paper mounted on the paper roll holder and masking tape from a roll of masking tape mounted on the auxiliary tape roll holder overlies a portion of the side of a roll of paper proximate the subframe.

5. A hand held masking machine as defined in claim 4 in which the subframe is detachably secured to the frame.

6. A hand held masking machine as defined in claim 5 in which the length of the means for mounting the subframe to the frame is adjustable to permit rolls of paper of differing widths to be dispensed.

7. A hand held masking machine as defined in claim 6 in which the means for mounting the subframe to the frame includes a support member, the length of which varies to vary the length of said means for mounting the subframe to the frame.

* * * * *